United States Patent [19]

Imai et al.

[11] Patent Number: 5,189,108
[45] Date of Patent: Feb. 23, 1993

[54] MODIFIED POLYMER RUBBER AND PROCESS FOR PREPARING THE SAME

[75] Inventors: Akio Imai; Mitsuji Tsuji; Takashi Sanada; Keisaku Yamamoto, all of Ichihara, Japan

[73] Assignee: Sumitomo Chemical Company, Limited, Osaka, Japan

[21] Appl. No.: 625,924

[22] Filed: Dec. 14, 1990

[30] Foreign Application Priority Data

Dec. 27, 1989 [JP] Japan .................................. 1-341453

[51] Int. Cl.⁵ .................... C08F 255/04; C08F 255/06
[52] U.S. Cl. ..................................... 525/285; 525/260;
525/263; 525/289; 525/296; 525/301; 525/308;
525/310; 525/312; 525/316; 525/317
[58] Field of Search ............... 525/260, 263, 285, 289,
525/296, 301, 308, 310, 312, 316, 317

[56] References Cited

U.S. PATENT DOCUMENTS

| | | | |
|---|---|---|---|
| 4,762,882 | 8/1988 | Okano | 525/285 |
| 4,780,509 | 10/1988 | Taubitz | 525/285 |
| 4,814,388 | 3/1989 | Nagai | 525/316 |
| 4,929,682 | 5/1990 | Banzi | 525/285 |
| 5,037,891 | 8/1991 | Takao et al. | 525/285 |

FOREIGN PATENT DOCUMENTS

| | | |
|---|---|---|
| 0082717 | 6/1983 | European Pat. Off. |
| 0096527 | 12/1983 | European Pat. Off. |
| 53-134891 | 11/1978 | Japan |
| 58-445 | 1/1983 | Japan |
| 61-002714 | 1/1986 | Japan |
| 61-2715 | 1/1986 | Japan |
| 61-16904 | 1/1986 | Japan |
| 62-10565 | 3/1987 | Japan |
| 62-112614 | 5/1987 | Japan |
| 64-45413 | 2/1989 | Japan |
| 8901962 | 3/1989 | World Int. Prop. O. |

*Primary Examiner*—James J. Seidleck
*Assistant Examiner*—Vasu S. Jagannathan
*Attorney, Agent, or Firm*—Stevens, Davis, Miller & Mosher

[57] ABSTRACT

A modified polymer rubber is obtained by
(1) graft-polymerizing at least one grafting monomer to a shreaded rubbery polymer (A) in an aqueous suspension at a temperature of 30°-130° C. to obtain a graft polymer, and
(2) kneading the graft polymer with at least one polymerizable monomer in the presence of a free radical initiator at a temperature of 180°-280° C. This process does not cause gel formation and is advantageous in manufacturing cost.

The modified polymer rubber thus obtained is excellent in processability and storage stability, and highly useful as a compatibilizer for various resins.

13 Claims, No Drawings

MODIFIED POLYMER RUBBER AND PROCESS FOR PREPARING THE SAME

The present invention relates to a modified polymer rubber modified with both an aromatic vinyl compound and an unsaturated carboxylic acid derivative, and a process for preparing the same.

In more particular, it relates to a modified polymer rubber modified with both an aromatic vinyl compound and an unsaturated carboxylic acid derivative, which rubber is excellent in processability and storage stability and is useful as a compatibilizer for various resins. It also relates to an improved process for preparing the modified polymer rubber, by which large amounts of both an aromatic vinyl compound and an unsaturated carboxylic acid derivative can be added to the rubber without gel formation during the processing.

In recent years, attempts have been made aiming at improving the properties of a rubbery polymer. These attempts include for example, enhancing its affinity to inorganic fillers and thereby improving the strength of the molded rubber products or improving its tackiness, adhesiveness and oil resistance, by graft-copolymerizing a polymerizable monomer to the rubbery polymer.

Recently, on the other hand, many attempts have been made to incorporate a rubbery polymer into a resin to improve the impact resistance of the resin One of the known methods formed in such attempts comprises graft-copolymerizing a resin-formable monomer to the rubbery polymer and incorporating the graft-copolymerized polymer into a resin in order to improve the compatibility between the resin and the rubbery polymer and the impact resistance of the resin.

For preparing a graft copolymer of the rubbery polymer, various processes have been already known For example, the techniques of grafting to ethylene-propylene terpolymer rubber (hereinafter sometimes abbreviated as EPM) or to ethylene-propylene-nonconjugated diene terpolymer rubber (hereinafter sometimes abbreviated as EPDM) may be briefly reviewed as follows.

There has been proposed since long a process which comprises grafting a polar monomer (e.g. maleic anhydride) for improving the adhesive and mechanical properties of EPM or EPDM.

For example, JP-B-58-53005, etc. disclose a process comprising grafting an unsaturated carboxylic acid or its anhydride to EPM in the presence of a free radical initiator in a alkylaromatic hydrocarbon medium.

However, the process requires a recovery step in order to isolate the reaction product by introducing the reaction mixture into a large amount of acetone to precipitate the product or by steam stripping. So that it is necessary to employ a large amount of expensive solvent and a recovery equipment for the solvent. For these drawbacks, the process is disadvantageous from the viewpoints of economical efficiency and profittability on an industrial scale.

To obviate the above-mentioned drawbacks, various processes have been disclosed which comprise grafting an unsaturated dicarboxylic acid anhydride to EPM or EPDM by using a kneading machine such as an extruder.

For example, Japanese Patent Application "Kokoku" No. 35-11,679 discloses a process comprising grafting maleic anhydride on a rubber, simultaneously crosslinking the rubber and forming ionic crosslinkages by using zinc oxide, etc.

Also, JP-B-53-19351, JP-A-49-104992 and JP-A50-67348 disclose processes comprising thermal addition of maleic anhydride to a rubber in an extruder and cross-linking the rubber with metallic salts, etc.

However, all these ionically crosslinked products of maleic anhydride-modified rubber have a drawback of not being flowable even at high temperatures and hence difficult to process under usual processing conditions.

JP-B-58-445 discloses a process for producing a thermoplastic elastomer which comprises grafting maleic anhydride or the like in the presence of a peroxide in an extruder.

In this process, however, when grafting of a large amount of maleic anhydride to EPM or EPDM is intended, gel sometimes forms during the processing or the Mooney viscosity ($ML_{1+4}$ 121° C.) of the resulting modified product sometimes becomes very high depending on the kneading conditions. Hence, this process, when reduced to practice, can only provide a modified product with a relatively low amount added of maleic anhydride, so that by this process, no improving effect on physical properties and processability of the product is expected.

In particular, it has already been known that in thermoplastic elastomers prepared by using an unsaturated dicarboxylic acid anhydride, the acid anhydride moiety is oxidized to carboxylic acid structure due to the moisture in the air during storage. Therefore, when they are processed by rolls, they assume a gel-like state and increase their Mooney viscosity, resulting in poor roll-processability.

Previously, the present invention studied for obtaining an ethylene-α-olefin copolymer rubber modified with an unsaturated dicarboxylic acid anhydride which is excellent in processability and storage stability. They also studied on the process for preparing the same by which a larger amount of unsaturated dicarboxylic acid anhydride added to the rubber, forming a smaller amount of gel and suppressing an extreme increase in Mooney viscosity ($ML_{1+4}$ 121° C.) as compared with the prior art processes. As a result, they found that a modified polymer rubber obtained by kneading an ethylene-α-olefin copolymer rubber with a free radical initiator, an aromatic vinyl monomer and an unsaturated dicarboxylic acid anhydride, as compared with those obtained without using an aromatic vinyl monomer, had a larger amount of unsaturated dicarboxylic acid anhydride added thereto and the anhydride moiety was oxidized to the carboxylic acid structure by moisture in a far less degree. The thus obtained modified rubber has no marked increase in Mooney viscosity, so that it shows a good processability. Based on the finding, they applied for a patent (JP-A-64-45413). However, although this process surely gives a modified copolymer having a high content of unsaturated dicarboxylic acid anhydride added thereto and forms little of gel-like substances, it requires the use of a starting rubber having a nonconjugated diene content of not higher than 3% by weight. This is clearly started in the specification of said application. Thus, when the process of said application is applied to EPDM containing more than 3% by weight of nonconjugated diene, a significant formation of gel-like substance results. Accordingly, an improvement in suppressing the gel formation has been desired. Further, according to the process, the amount of the aromatic vinyl monomer in the graft copolymer is limited to less than about 5% by weight. This is because in order to increase the grafted amount of the aromatic vinyl compound by the process, it is necessary to greatly increase the amount of the monomer used in the kneading-grafting reaction, but, when a large amount of these monomers, which are liquid or gas under the reaction conditions, is used, the reaction system assumes the form of liquid or foam, which results in poor kneading efficiency and leads to difficulty in reaction control. Therefore, it had to be admitted that according to the process, it was difficult from the practical point of view to increase the grafted amount of the aromatic vinyl monomer over about 5% by weight.

On the other hand, utterly different processes may be adopted in order to simply increase the amount of aromatic vinyl monomers grafted.

For example, another application assigned to the present assignee (JP-B-62-10565) discloses a process which comprises grafting styrene, acrylonitrile, etc. to a shredded rubbery polymer in an aqueous suspension in a high graft efficiency. This process also has such disadvantages that when the process is applied to the grafting of unsaturated carboxylic acid derivatives etc., the conversion in the graft reaction is very low and, if a large amount of free-radical initiator is used to promote the graft reaction, gels are formed and makes it impossible to process the modified copolymer in practice.

In recognition of the situation, one of the main objects of the present invention is, overcoming the difficulties of the prior art processes, to provide a modified polymer rubber having an aromatic vinyl monomer, or an aromatic vinyl monomer and non-aromatic vinyl monomer, and an unsaturated monocarboxylic acid derivative or the like added thereto which rubber has a high content of these monomers added thereto, undergoes substantially no increase in Mooney viscosity and hence is excellent in processability and storage stability and is highly suitable for use as a compatibilizer for various resins. Another object of the present invention is to provide a highly suitable process for preparing said modified polymer rubber which accompanies little of gel-like substance formation and is excellent in economical efficiency and profitability.

According to the present invention, there are provided a modified polymer rubber comprising a rubbery polymer (A) to which are added (I) at least one grafting monomer (E) selected from the group consisting of
aromatic vinyl monomers (B) and
vinyl monomers (F) consisting of
at least one aromatic vinyl monomer (B) and at least one non-aromatic vinyl monomer (C) and
at least one polymerizable monomer (D) selected from the group consisting of
unsaturated dicarboxylic acid anhydrides and the derivatives thereof,
unsaturated monocarboxylic acid esters and the derivatives thereof,
unsaturated carboxylic acid amides and the derivatives thereof, and
unsaturated carboxylic acid ethers and the derivatives thereof, the weight ratio of (A) to (E) being from 100:4 to 100:90 and the weight ratio of (A):(D) being from 100:0.1 to 100:5; and a process for preparing a modified polymer rubber comprising the steps of:
(1) graft-polymerizing to a shredded rubbery polymer (A) in an aqueous suspension at a temperature of 30°–130° C. at least one grafting monomer (E) selected from the group consisting of
aromatic vinyl monomers (B) and
vinyl monomers (F) consisting of
at least one aromatic vinyl monomer (B) and
at least one non-aromatic vinyl monomer (C) to obtain a graft polymer, and (2) kneading the graft polymer with at least one polymerizable monomer (D) selected from the group consisting of unsaturated dicarboxylic acid anhydrides and the derivatives thereof, unsaturated monocarboxylic acid esters and the derivatives thereof, unsaturated carboxylic acid amides and the derivatives thereof and unsaturated carboxylic acid ethers and the derivatives thereof, in the presence of a free-radical initiator at a temperature of 180°–280° C., to obtain the modified polymer rubber.

Specific examples of the rubbery polymers (A) usable in the present invention are rubbers such as ethylene-α-olefin copolymer rubber, ethylene-α-olefin-non-conjugated diene copolymer rubber, styrene-butadiene copolymer rubber, polybutadiene rubber, polyisoprene rubber, natural rubber, acrylonitrile-butadiene copolymer rubber, ethylene-vinyl acetate copolymer rubber, acrylic rubber, and ethylene-acrylic ester copolymer rubber.

Of these, preferable are ethylene-α-olefin copolymer rubber and ethylene-α-olefin-nonconjugated diene copolymer rubber because they form less amount of gel in the step (2) described later and give a higher graft efficiency (namely, the proportion of the monomers actually added to the rubber in the fed monomers) in the step (1) and the step (2).

Specific examples of the ethylene-α-olefin copolymer rubbers are copolymer rubbers of ethylene and another α-olefin, e.g. propylene, 1-butene, 1-pentene, 1-hexene, 4-methyl-1-pentene, 1-octene etc., and terpolymer rubbers such as ethylene-propylene-1-butene terpolymer rubber, etc. Of these, preferable are ethylene-propylene copolymer rubber and ethylene-1butene copolymer rubber.

Preferred examples of the nonconjugated diene in the ethylene-α-olefin-nonconjugated diene copolymer rubber include 5-ethylidene-2-norbornene, dicyclopentadiene, 1,4-hexadiene, etc. From the viewpoint of preventing gel formation, the content of the non-conjugated diene in the rubbery polymer (A) is preferably not more than 24% by weight. Further, the ethylene content in the rubbery polymer (A) is preferably 15–85% by weight, more preferably 40–80% by weight, and most preferably 50–70% by weight. Highly crystalline copolymers with an ethylene content of more than 85% by weight tend to be difficult to process under usual conditions of rubber processing, whereas those with an ethylene content of less than 15% by weight have an increased glass transition point (Tg) and are sometimes poor in rubbery properties.

The number average molecular weight of the rubbery polymer (A) is preferably in a range which permits the kneading of the polymer in an extruder, in which the reaction of the step (2) is to be performed. It is usually 10,000–100,000, preferably 40,000–60,000. When the molecular weight is lower than 10,000, the polymer tends to be difficult to handle in feeding to the extruder, whereas when it is higher than 100,000, the polymer sometimes has a low flowability and tends to be difficult to process. Thus, by appropriately selecting the molecular weight, a modified polymer rubber of a good processability can be obtained whose Mooney viscosity ($ML_{1+4}$ 121° C.) falls in the range of 5-120.

Although the Mooney viscosity ($ML_{1+4}$ 121° C.) of the modified copolymer rubber obtained by the process of the present invention usually falls in the range of 5-120, it can be made to fall in the range of 20-100 by selecting starting materials and preparation conditions. This is because when the copolymer rubber is used for blending into a rubber, the copolymer rubber has preferably a Mooney viscosity, $ML_{1+4}$ 121° C., of 10-75 and more preferably, has a Mooney viscosity, $ML_{1+4}$ 121° C., of 25-70. On the other hand, when the copolymer rubber is used as an impact resistance improving agent for general purpose plastics, engineering plastics, etc., the copolymer rubber preferably has a Mooney viscosity, $ML_{1+4}$ 121° C., of 5-120, more preferably, it has a Mooney viscosity of 20-100.

When $ML_{1+4}$ 121° C. is less than 5, the copolymer rubber gives a poor strength when blended with a rubber or a resin, whereas when it is more than 120, the resulting blend is poor in processability.

The aromatic vinyl monomer (B) used in the present invention is preferably styrene, but may also be o-methylstyrene, p-methylstyrene, m-methylstyrene, α-methylstyrene or the like. They may be used also as a mixture thereof.

In the step (1) of the present invention, a non-aromatic vinyl monomer (C) may be used together with the aromatic vinyl monomer (B). Specific examples of such non-aromatic vinyl monomer (C) are unsaturated nitriles such as acrylonitrile and methacrylonitrile; unsaturated carboxylic acids such as acrylic acid and methacrylic acid; alkyl esters of acrylic or methacrylic acid such as methyl acrylate and methyl methacrylate; vinyl chloride, etc., used each alone or in admixture of two or more thereof. Particularly, acrylonitrile and methyl acrylate are preferably used from the viewpoint of reactivity in copolymerization with the aromatic vinyl monomer (B).

The amount of aromatic vinyl monomer (B) added, or aromatic vinyl monomer (B) and non-aromatic vinyl monomer (C) added, to the modified polymer rubber is 4-90 parts by weight per 100 parts by weight of the rubbery polymer (A). When it is less than 4% by weight, the polymer rubber is poor in compatibilizing capability for use as a compatibilizer for various resins, whereas when it exceeds 90 parts by weight, the resulting polymer rubber does not exhibit rubbery properties but show resin-like properties and, when used as a compatibilizer for various resins, may give a resin mixture of deteriorated properties.

The polymerizable monomer (D) used in the step (2) of the process of the present invention described later is selected from the group consisting of unsaturated dicarboxylic acid anhydrides, unsaturated monocarboxylic acid esters, unsaturated carboxylic acid amides, unsaturated ethers, and the derivatives thereof. Specific examples of the monomers included in the group are maleic anhydride, fumaric anhydride, citraconic anhydride, chloromaleic anhydride, maleimide, N-aromatic maleimide, N-aliphatic maleimide, acrylamide, methacrylamide, N-methylolacrylamide, itaconic anhydride, methyl acrylate, ethyl acrylate, butyl acrylate, methyl methacrylate, ethyl methacrylate, butyl methacrylate, maleic hydrazide, reaction products of maleic anhydride with diamines, himic anhydride (bicyclo [2,2,1]hepta-5-en-2,3-dicarboxylic acid anhydride), dimethylaminopropylacrylamide, 7-amino-3,7-dimethyloctyl acrylate, methyl 2-cyanoacrylate, tetrahydrofulfuryl acrylate, glycidyl acrylate, glycidyl methacrylate, allyl glycidyl ether, himic anhydride chloride, etc. Further, citric acid, which is a saturated carboxylic acid and is generally not included in unsaturated carboxylic acids, is, in the reaction of the step (2) of the present invention, converted into itaconic anhydride as the result of dehydration and decarboxylation caused by heating during the reaction, and hence can be used as a sort of unsaturated carboxylic acid derivatives in the present invention.

Of these, preferable are maleic anhydride, methacrylamide, N-methylolacrylamide, and allyl glycidyl ether. In particular, maleic anhydride, which has a high reactivity, is more preferably used.

The amount of the polymerizable monomer (D) added to the modified polymer rubber of the present invention is preferably 0.1-5 parts by weight per 100 parts by weight of the rubbery polymer (A). When the amount is less than 0.1 part by weight, the resulting polymer rubber tend to be unsatisfactory in compatibilizing capability for use as a compatibilizer for various resins, whereas when it exceeds 5 parts by weight, the rubber tend to be unsatisfactory from the viewpoint of processability.

Now, the process for preparation according to the present invention will be described below.

The process of the present invention comprises the step (1) and the step (2).

The step (1) is a step of graft - polymerizing to a shredded rubbery polymer (A) in an aqueous suspension at a temperature of 30°-130° C. at least one grafting monomer (E) selected from the group consisting of aromatic vinyl monomers (B) and vinyl monomers (F) consisting of at least one aromatic vinyl monomer (B) and at least one non-aromatic vinyl monomer (C). The rubbery polymer (A of the starting material is shredded with a cutter, grinding machine or such and then fed to a reactor. The granule size of the shredded rubbery polymer (A) is not particularly limited, but is preferably not more than about 3 mm from the viewpoint of enhancing the contact efficiency with the monomers to be added and preferably not less than about 1 mm from the viewpoint of easiness of recovery operations after the reaction. The proportion of the grafting monomer (E) to the rubery polymer (A) used varies according to the kinds of the monomers used and the properties required for the objective modified polymer rubber In general, the total amount of the grafting monomer (B) is 1–900 parts by weight relative to 100 parts by weight of the rubbery polymer (A). Particularly when ethylene-α-olefin copolymer rubber or ethylene-α-olefin-non-conjugated diene copolymer rubber is used with the grafting monomer (E), the total amount of the grafting monomer (E) is preferably in the range of 5–100 parts by weight per 100 parts by weight of the rubbery polymer. When the amount of the grafting monomer (E) used is less than 5 parts by weight, the amount of the grafting monomer (E) added to the rubbery polymer (A) decreases, which result in the reduction of the modification effect, that is, the reduction of the compatibilizing capability of the modified polymer in use as a compatibilizer for various resins, aimed at by the present invention. When the amount exceeds 100 parts by weight, there may be caused such undesirable results that in the reaction of the step (1), the rubbery polymer granules are swollen by the monomers, increase their tackiness to stick to one another and making their handling difficult, or the homopolymer of the aromatic vinyl monomer (B) is produced in a remarkably large yield lowers the graft efficiency and results in the deterioration of the capability as a compatibilizer.

Thus, it is preferable to perform grafting in the range of amount of the grafting monomer (E) used of 1 5-100 parts by weight, since the final product thus obtained shows rubbery properties and at the same time exhibits a high compatibilizing capability.

The amount of water used in the step (1) of the present invention is not particularly limited so long as it is sufficient for maintaining the rubber granules in a state of stable aqueous suspension. In general, it is suitably 50-1,000 parts by weight relative to 100 parts by weight of the total amount of the rubbery polymer (A) and the grafting monomer (E).

Various emulsifiers and dispersants may be used to suspend the shredded polymer granules stably in an aqueous medium and enhance the absorption efficiency for monomers. For this purpose, there may be used polyvinyl alcohol, alkylcellulose, hydroxyalkylcellulose, polyoxyethylene-polyoxypropylene block polyether, polyoxyethylene alkylphenyl ether, and so forth. Particularly, polyoxyethylene-polyoxypropylene block polyether is preferably used. Although the amount of the dispersant used is not particularly limited, when the amount is too small, a stable suspension state sometimes cannot be maintained and the graft copolymer produced becomes lumps, whereas when the amount is too large, it tend to cause severe foaming during the polymerization, to cause increase in the amount of the dispersant remaining in the recovered graft copolymer or to increase in the concentration of the dispersant in waste water to make the waste water treatment troublesome. In general, the amount of the dispersant is preferably 0.01-1 part by weight relative to 100 parts by weight of water.

In the reaction of the step (1) of the process of the present invention, known polymerization catalysts soluble in the monomer may be used.

The catalyst used includes, for example, organic peroxides such as benzoyl peroxide, lauroyl peroxide, t-butyl peroxypivalate, t-butyl hydroperoxide and dicumyl peroxide, and azo compounds such as azobisisobutyronitrile and azobisdimethylvaleronitrile. The polymerization catalyst may be added as a solution in a monomer, or added as such. In adding the polymerization catalyst, the whole amount thereof may be added before the initiation of polymerization or alternatively, a part thereof may be added before the initiation of polymerization and the remainder divided in portions during polymerization.

An advantage of the process of the present invention is that in the reaction of step (1), a graft copolymer is obtained with a high graft efficiency of the grafting monomer (E) and, by using the graft copolymer in the reaction of the step (2), a modified copolymer rubber having a high content of the polymerizable monomer (D), e.g. unsaturated dicarboxylic acid anhydride, is obtained without gel formation. The graft copolymer obtained in the step (1) is preferably separated and recovered from the aqueous medium by such means as decantation of filtration, and then the water adhereing to the graft copolymer which is in the form of granules or crumbs is removed by such means as centrifugal dehydration or hot-air drying. In this case, the amount of water remaining in the graft copolymer is preferably reduced to 10 parts by weight or less, more preferably 5 parts by weight or less, from the viewpoint of preventing the inhibition of the reaction in the step (2) and preventing foaming during kneading in the step (2).

The step (2) of the present invention is a step of kneading the graft copolymer obtained in the step (1) with at least one polymerizable monomer (D) selected from the group consisting of unsaturated diocarboxylic acid anhydrides, unsaturated monocarboxylic acid esters, unsaturated carboxylic acid amides, unsaturated ethers, and the derivatives thereof, in the presence of a free radical initiator at a temperature of 180°-280° C., to obtain a modified polymer rubber.

Thus, in the step (2) the graft copolymer obtained in the step (1) to which an aromatic vinyl monomer etc. have been grafted is used and a reaction of further adding a polymerizable monomer (D), such as an unsaturated dicarboxylic acid anhydride, to the graft copolymer is carried out under specified kneading conditions.

The amount of the polymerizable monomer (D) used is preferably 0.3-10 parts by weight per 100 parts by weight of the rubery polymer (A). When the amount is less than 0.3 part, the high graft efficiency intended in the present invention sometimes cannot be obtained. On the other hand, even when the polymerizable monomer is used in a larger amount than 10 parts, the graft efficiency tends to hit the ceiling and much of the monomer tends to be discharged unreacted out of the system, which may be industrially disadvantageous.

Though the kinds of the polymerizable monomer (D) used in the step (2) have already been described above, a radical-polymerizable monomer other than the polymerizable monomer (D) may also be used together with the polymerizable monomer (D) in said step. Specific examples of such radical-polymerizable monomers are unsaturated nitriles (e.g. acrylonitrile and methacrylonitrile), and unsaturated carboxylic acids (e.g. acrylic acid, methacrylic acid, maleic acid, fumaric acid, itaconic acid and crotonic acid.). They can be used each alone or as a mixture of two or more thereof. In some cases, depending on the kinds of properties and their levels required for the modified copolymer rubber, it is also possible to use the aromatic vinyl monomer (B) in the step (2) with the polymerizable monomer (D).

The free radical initiators used in the step (2) of the present invention are preferably those which effectively form a radical at the reaction temperature. Organic peroxides are preferable.

Specific examples of the organic peroxide used are dicumyl peroxide, 1,1-bis(t-butylperoxy)cyclohexane, 1,1-bis(t-butylperoxy)-3,3,5-trimethylcyclohexane, 2,5-dimethyl-2,5-di(t-butylperoxy)hexane, $\alpha,\alpha'$-bis(t-butylperoxy-m-isompropyl)benzene, di-t-butyl peroxide and t-butylcumyl peroxide. Of these, preferred are $\alpha,\alpha'$-bis(t-butylperoxy-m-isopropyl)benzene, 1,1-bis(t-butylperoxy)-3,3,5-trimethylcyclohexane, 2,5-dimethyl-2,5-di(t-butylperoxy)hexane, etc.

The amount of the free radical initiator is in the range of generally 0.005-1.0 part by weight, preferably 0.01-0.5 part by weight, relative to 100 parts by weight of the rubery polymer (A), although it varies depending on the type of free radical initiator and the kneading conditions. When the amount used is less than 0.005 part by weight, the polymerizable monomer (D) sometimes cannot be added in a desirable amount, whereas when it exceeds 1.0 part by weight, gel are formed.

In the step (2) of the process of the present invention, the respective components described above are kneaded at a temperature of 180°–280° C., preferably 200°–260° C., to obtain the modified copolymer rubber.

When too much oxygen is present in the kneading, it may cause the formation of gel or heavy discoloration. Therefore, the kneading is desirably performed substantially in the absence of oxygen.

When the kneading temperature is below 180° C., the amount of polymerizable monomer added tends to be smaller than intended, i.e. the effect of enhancing the amount of the polymerizable monomer added by graft reaction is small. When the temperature exceeds 280° C., the effect of enhancing the amount of the polymerizable monomer added by graft reaction tends to be small, either, and, there are sometimes caused, disadvantageously, gel and discoloration.

The kneading machine used in the step (2) is not particularly limited. Generally, an extruder is preferably used because it enables continuous production. Preferably, the extruder has a single or twin screw suitable for uniformly mixing various starting materials fed thereinto.

The retention time in the extruder may vary depending on the kneading temperature and the kinds of free radical initiator, but it is usually about 0.2–10 minutes.

In feeding the respective components described above to the kneader, it is possible to feed them each separately. It is also possible to uniformly mix a part or whole of the components and feed the mixture. An adoptable method comprises, for example, incorporating the rubber component with the free radical initiator to obtain a mixture, feeding the polymerizable monomer (D) with the mixture into a kneader simultaneously, and kneading the components fed. Another usable method comprises feeding the free radical initiator and/or the polymerizable monomer (D) from a certain opening in the midway of the extruder in order to effect the modification reaction. It is also possible to add, into the reactor of the step (1) or into the extruder of the step (2) through the inlet, as occasion demands, plastics such as polyethylene, nylon, polyester, ABS and polyphenylene ether, and elastomers such as styrenebutadiene block copolymer, styrene-isoprene block copolymer, and the hydrogenation products thereof, whereby co-modification of two or more kinds of polymers can be effected.

To remove unreacted polymerizable monomer (D) etc. from the reaction product of the step (2), suction may be applied in the midway of or near the outlet of the extruder through a vent line by means of a vacuum pump. Alternatively, the reaction product can be purified by dissolving it in a suitable solvent and precipitating it from the solution.

The modified copolymer rubber of the present invention is obtained by adding an aromatic vinyl monomer (B), or an aromatic vinyl monomer (B) and a non-aromatic vinyl monomer (C), and a polymerizable monomer (D) such as an unsaturated carboxylic acid derivative to a rubbery polymer (A). When an unsaturated dicarboxylic acid anhydride is selected as the polymerizable monomer (D) and an aromatic vinyl monomer (B) is used with the polymerizable monomer (D) in the step (2), the resulting modified copolymer rubber is always excellent in processability since unsaturated dicarboxylic acid anhydrides are difficultly changed into the corresponding carboxylic acid by moisture in the air.

According to the process of the present invention, due to the use of an aromatic vinyl monomer (B) in grafting reaction of the step (1), it becomes possible to prevent gel formation in the addition reaction of a polymerizable monomer (D) of the step (2). Moreover, the intended extent of addition can be attained by using a relatively small amount of polymerizable monomer (D) and hence there is no need for removing a large amount of unreacted polymerizable monomer (D). Thus, the process is very economically advantageous and efficient.

One of the most outstanding features of the process of the present invention resides on the combination of two steps specified above.

Only by the process can be prepared a modified polymer rubber having an excellent processability which has a high content of an aromatic vinyl monomer (B), or an aromatic vinyl monomer (B) and non-aromatic vinyl monomer (C), an polymerizable monomer (D) such as an unsaturated carboxylic acid derivative added thereto without gel formation during the process. Prior to the present invention, no process for producing a modified copolymer having a high content of grafted monomer without gel formation has been known. The present inventors are the first to find that a specific combination of the steps described above can provide such a modified copolymer having desirable properties.

The reason why the process gives such an excellent result has not yet been definitely clear at present, but it may be assumed that the graft copolymer obtained by the reaction of the step (1) exerts a sort of lubricant-like action in the extruder to prevent excessive shear and resultant heat generation. Such assumption, however, is not to be construed as limiting the scope of the present invention.

The modified polymer rubber of the present invention may be used not only as a thermoplastic elastomer as such, but also as a blending material. That is, it may be incorporated in a suitable amount into general purpose plastics, such as polypropylene, polyethylene, polystyrene, ABS and PVC, or engineering plastics, such as nylon, polyacetal, polycarbonate, modified or unmodified polyphenylene ether, polyethylene terephthalate and polybutyrene terephthalate, to improve their adhesiveness, impact resistance, flexibility, etc.

Further, the modified polymer rubber may be incorporated into rubbers, such as EPM, EPDM, styrenebutadiene rubber and butadiene rubber, to improve their adhesiveness, vulcanizability, processability, mechanical properties, etc. Particularly, when it is blended with a material having hydroxyl groups, amino groups or epoxy groups in the molecule, an enhanced improvement in properties can be achieved.

The modified polymer rubber may be used also for primers in coating, adhesive agents and adhesive tapes.

The present invention will be described in detail below with reference to Examples, but it is in no way limited thereto.

The amount of styrene added to the graft copolymer obtained in the step (1) was determined from the intensity of the peak corresponding to a substituted benzene ring which appeared in the infrared absorption spectrum. The amount of maleic anhydride added to the modified copolymer rubber obtained in the step (2) was determined by dissolving the extrudate sample in a small amount of toluene, precipitating it with anhydrous acetone, dissolving the sample thus purified in toluene, and titrating the resulting solution with a KOH ethanol solution at an elevated temperature (85° C.) using phenolphthalen as an indicator.

The amount of styrene added, when styrene was used as the polymerizable monomer (C) of the step (2), was determined from the intensity of the peak corresponding to a substituted benzene ring which appeared in the infrared absorption spectrum of the sample purified as described above.

The amount of gel formed was expressed by percent by weight of warm tetrahydrofuran (60° C.)—insolubles.

The Mooney viscosity was determined in terms of $ML_{1+4}$ 121° C. according to JIS K6300 using an L-rotor at 121° C.

EXAMPLE 1

In a stainless steel autoclave equipped with a stirrer were charged 100 parts by weight of a commercially available ethylene-α-olefin-nonconjugated diene copolymer rubber (nonconjugated diene: 5-ethylidene-2-norbornene) having an ethylene unit content of 56% by weight, iodine value of 11 and $ML_{1+4}$ 121° C. of 61 (shredded) as an ethylene-α-olefin-nonconjugated diene copolymer rubber, 350 parts by weight of pure water, 4.0 parts by weight of calcium tertiary phosphate and 4.0 parts by weight of Pluronic® F-68 (a registered trade name, mfd. by Asahi Denka Kogyo K.K.). Then, the inner atmosphere was thoroughly replaced with nitrogen while the charged materials were being stirred.

Then, 20 parts by weight of styrene monomer and 1.0 part by weight of Sanperox® TO (a registered trade name, mfg. by Sanken Kako Inc.) as a free radical initiator were added thereto. The resulting mixture was brought up to 110° C. over a period of 80 minutes, and then the reaction was continued for 1 hour. After cooling, the styrene-graft copolymer rubber was collected by filtration, washed thoroughly with pure water and then dried under vacuum. The analysis of the graft copolymer obtained in the step (1) revealed that the amount of grafted polystyrene was 16 parts by weight and the amount of non-grafted polystyrene extracted was 3.6 parts by weight, per 20 parts by weight of the added styrene monomer, and the calculated graft efficiency was 82%.

Then, the reaction of the step (2) was carried out by mixing 100 parts by weight of the styrene-graft copolymer rubber obtained above with 0.08 part by weight of 1,1-bis(t-butylperoxy)-3,3,5-trimethylcyclohexane on a mixing roll, and then kneading the mixture with 5 parts by weight of maleic anhydride in a twin-screw extruder set at 250° C. The analysis of the modified copolymer rubber obtained showed that the amount of maleic anhydride in the resulting modified copolymer rubber was 3.2% by weight (3.8 parts by weight based on the original EPDM), the amount of maleic anhydride added to the modified copolymer rubber was 2.1% by weight (2.5 parts by weight based on the original EPDM), and the graft efficiency was 66%. Further, the modified copolymer was dissolved in tetrahydrofuran at 60° C. and filtered through a 120-mesh SUS screen. Resultantly, the amount of gel-like insolubles collected by filtration showed a value of 0.23% in the modified polymer rubber. The value was considered to be satisfactorily low.

EXAMPLES 2 TO 5 AND COMPARATIVE EXAMPLES 1 TO 5

The same procedures as in Example 1 were repeated except for altering the kinds of the rubbery polymer as the starting material, the amount of aromatic vinyl monomer, or the reaction conditions of the step (1) or step (2).

The results thus obtained are shown in Table 1 with the results of Example 1.

EXAMPLES 6 TO 8

The same procedures as in Example 1 were repeated except for using the compounds shown in Table 2 in place of maleic anhydride used in the reaction of step (2) in Example 1.

The results of analysis of the modified polymer rubber are also shown in Table 2.

TABLE 1

| | | Example 1 | Example 2 | Example 3 | Example 4 | Comp. Example 1 | Comp. Example 2 | Example 5 | Comp. Example 3 | Comp. Example 4 | Comp. Example 5 |
|---|---|---|---|---|---|---|---|---|---|---|---|
| Rubbery polymer (A) | Ethylene content (wt. %) | 56 | 56 | 65 | 65 | 56 | 56 | 56 | 56 | 53 | 56 |
| | α-Olefin species | Propylene | Propylene | Butene-1 | Butene-1 | Propylene | Propylene | Propylene | Propylene | Propylene | Propylene |
| | Nonconjugated diene*1 species | ENB | DCPD | ENB | ENB | ENB | ENB | ENB | ENB | ENB | ENB |
| | Nonconjugated diene content (wt. %) | 5.2 | 10.4 | 8.2 | 8.2 | 5.2 | 5.2 | 5.2 | 5.2 | 25 | 5.2 |
| | Number average mol. wt. | 60,000 | 50,000 | 40,000 | 40,000 | 60,000 | 60,000 | 60,000 | 60,000 | 50,000 | 60,000 |
| Step (1) Amount used | Rubbery polymer (A) (parts by wt.) | 100 | 100 | 100 | 100 | 100 | 100 | 100 | —*6 | 100 | 100 |
| | Styrene (parts by wt.) | 20 | 30 | 40 | 36 | 120 | 20 | 5 | | 20 | 20 |
| | Acrylonitrile (parts by wt.) | 0 | 3 | 0 | 4 | 0 | 0 | 0 | | 0 | MAH 5*7 |
| | Reaction state | Reaction proceeded in good slurry state. Graft copolymer formed was easily collected by filtration | | | | Granules stuck with one another. Difficulty recoverable —*5 | Good | Good | —*5 | Good | Good |
| Step (2) | Amount of styrene added to graft copolymer formed (parts by wt.)*2 | 16.0 | 23.2 | 31.5 | 30.2 | | 16.1 | 4.3 | —*6 | 17.8 | 15.9 |
| | Amount of acrylonitrile added to graft copolymer formed (parts by wt.)*2 | 0 | 2.4 | 0 | 3.6 | | 0 | 0 | | 0 | 0 |
| | Graft copolymer (parts by wt.)*3 | 100 | 100 | 100 | 100 | —*5 | 100 | 100 | 100 | 100 | —*7 |
| | MAH*4 (parts by wt.) | 5 | 5 | 5 | 5 | | 2 | 5 | Styrene 2.2*6 | 5 | |
| | Kneading temperature (°C.) | 250 | 230 | 260 | 220 | | 160 | 250 | 250 | 250 | |

TABLE 1-continued

|  | Example 1 | Example 2 | Example 3 | Example 4 | Comp. Example 1 | Comp. Example 2 | Example 5 | Comp. Example 3 | Comp. Example 4 | Comp. Example 5 |
|---|---|---|---|---|---|---|---|---|---|---|
| Mooney viscosity of modified polymer rubber formed ($M_{1+4}$ 121° C.) | 90 | 82 | 70 | 76 | —*5 | 88 | 68 | 63 | Unmeasable | 88 |
| Amount of MAH added to modified polymer rubber (parts by wt.) | 2.1 | 1.8 | 1.6 | 1.4 |  | 0.03 | 1.8 | MAH 1.3 Styrene 0.8 | Unmeasurable | Not detected |
| Amount of gel in modified polymer rubber (parts by wt.) | 0.23 | 0.31 | 0.13 | 0.18 |  | 0.21 | 0.18 | 28 | >50 | 0.16 |

Notes:
*[1]ENB: 5-Ethylidene-2-norbornene, DCPD: Dicyclopentadiene
*[2]Amount per 100 parts by wt. of rubbery polymer (A)
*[3]Polymer recovered in the reaction of step (1)
*[4]MAH: Maleic anhydride
*[5]Uniform product could not be obtained. The reaction of step (2) could not be performed.
*[6]The reaction of step (2) alone was performed with addition of 5 parts by wt. of styrene and 5 parts by wt. of MAH, without performing the reaction of step (1).
*[7]MAH was added together with styrene in the reaction of step (1). The reaction of step (2) was omitted.

TABLE 2

|  |  | Example 6 | Example 7 | Example 8 |
|---|---|---|---|---|
| Monomer (D) used in step (2) (part by wt.) |  | Allyl glycidyl ether (2) | Acrylamide (2) | N-Methylolacrylamide (2) |
| Results of analysis of modified polymer rubber | Amount of styrene added (part by wt.)*[1] | 15.3 | 16.4 | 15.7 |
|  | Amount of monomer (D) added (part by wt.)*[1] | 0.8 | 1.1 | 1.3 |
|  | Mooney viscosity ($ML_{1+4}$ 121° C.) | 86 | 95 | 102 |
|  | Amount of gel (wt. %) | 0.26 | 0.29 | 0.38 |

Note:
*[1]Part by wt. per 100 parts by wt. of rubbery polymer (A) as starting material As described above, according to the present invention, there is provided a modified polymer rubber having an aromatic vinyl monomer, or alternatively an aromatic vinyl monomer and non-aromatic vinyl monomer, and an unsaturated monocarboxylic acid derivative or the like added to the rubber. The rubber has a high content of said monomers, undergoes substantially no increase in Mooney viscosity and hence is excellent in processability and storage stability. It is highly suitable for use as a compatibilizer for various resins. According to the present invention, there is also provided a suitable process for preparing said modified polymer rubber which causes no gel formation during the process and is excellent in economical efficiency and profitability.

What is claimed is:

1. A process for preparing a modified polymer rubber comprising the steps of:
   (1) graft-polymerizing to a shredded rubbery polymer (A) in an aqueous suspension at a temperature of 30°–130° C. at least one grafting monomer (E) selected from the group consisting of
   aromatic vinyl monomers (B) and
   vinyl monomers consisting of:
      at least one aromatic vinyl monomer (B) and at least one non-aromatic vinyl monomer (C) selected from the group consisting of:
      acrylonitrile,
      methacrylonitirle,
      acrylic acid,
      acrylic acid alkyl esters,
      methacrylic acid,
      methacrylic acid alkyl esters, and
      vinyl chloride, the weight ratio of the rubbery polymer (A) to the grafting monomer (E) falling with in the range of from 100:5 to 100:100, to obtain a graft polymer, and
   (2) kneading the graft copolymer with at least one polymerizable monomer (D) selected for the group consisting of:
      unsaturated dicarboxylic acid anhydrides and the derivatives thereof,
      unsaturated monocarboxylic acid esters and the derivatives thereof,
      unsaturated carboxylic acid amines and the derivatives thereof, and
      unsaturated carboxylic acid ethers and the derivatives thereof,
      in the presence of a free radical initiator at a temperature of 180°–280° C.

2. The process of claim 1, wherein the step (1) includes the step of selecting as the rubbery polymer (A) at least one member selected from the group consisting of
   an ethylene-α-olefin copolymer rubber having a number average molecular weight of 10,000–100,000 and an ethylene unit content of 15–85% by weight, and
   an ethylene-α-olefin-nonconjugated diene copolymer rubber having a number average molecular weight of 10,000–100,000, an ethylene unit content of 15–85% by weight and a nonconjugated diene unit content of not more than 24% by weight.

3. The process of claim 1, wherein the step (1) includes the step of selecting an aromatic vinyl monomer (B) as the grafting monomer (E).

4. The process of claim 3, wherein the step (1) includes the step of selecting at least one member selected from the group consisting of styrene, o-methylstyrene, m-methylstyrene, p-methylstyrene and α-methylstyrene as the aromatic vinyl monomer (B).

5. The process of claim 1, wherein the step (1) includes the step of selecting styrene as the aromatic vinyl monomer (B).

6. The process of claim 1, wherein the step (1) includes the step of selecting vinyl monomers (F) consisting of at least one aromatic vinyl monomer (B) and at least one non-aromatic vinyl monomer (C) as the grafting monomers (E).

7. The process of claim 6, wherein the step (1) includes the step of selecting at least one member selected from the group consisting of styrene, o-methylstyrene, m-methylstyrene, p-methylstyrene and α-methylstyrene as the aromatic vinyl monomer (B).

8. The process of claim 7, wherein the step (1) includes the step of selecting styrene as the aromatic vinyl monomer (B).

9. The process of claim 1, wherein the step (1) includes the step of selecting acrylonitrile as the nonaromatic vinyl monomer (C).

10. The process of claim 1, wherein the step (2) includes the step of selecting at least one member selected from the group consisting of maleic anhydride, allyl glycidyl ether, acrylamide and N-methylolacrylamide as the polymerizable monomer (D).

11. The process of claim 10, wherein the step (2) includes the step of selecting maleic anhydride as the polymerizable monomer (D).

12. The process of claim 1, wherein the step (2) includes the step of selecting a weight ratio of the rubbery polymer (A) to the polymerizable monomer (D) within the range of from 100:0.3 to 100:10.

13. A process for preparing a modified polymer rubber comprising the steps of:
  (1) graft-polymerizing to a shredded rubbery polymer (A) in an aqueous suspension at a temperature of 30 –130° C. at least one grafting monomer (E) selected from the group consisting of
    aromatic vinyl monomers (B) and
    vinyl monomers consisting of:
      at least one aromatic vinyl monomer (B) and at least one. non-aromatic vinyl monomer (C) selected from the group consisting of:
      acrylonitrile,
      methacrylonitrile,
      acrylic acid,
      acrylic acid alkyl esters,
      methacrylic acid,
      methacrylic acid alkyl esters, and
      vinyl chloride, the weight ratio of the rubbery polymer (A) to the grafting monomer (E) falling within the range of from 100:5 to 100:100, to obtain a graft polymer, and
  (2) kneading the graft copolymer with at least one polymerizable monomer (D) selected from the group consisting of:
    maleic anhydride,
    allyl glycidyl ether,
    acrylamide, and
    N-methylol-arylamide, in the presence of a free radical initiator at a temperature of 180°–280° C.

* * * * *